United States Patent [19]

Kawasaki et al.

[11] Patent Number: 5,034,281
[45] Date of Patent: Jul. 23, 1991

[54] RESIN COMPOSITIONS AND MULTI-LAYERED STRUCTURES UTILIZING THE SAME

[75] Inventors: Akihiko Kawasaki, Amagasaki; Tohei Moritani, Kurashiki, both of Japan

[73] Assignee: Kuraray Co., Ltd., Kurashiki, Japan

[21] Appl. No.: 579,082

[22] Filed: Sep. 10, 1990

Related U.S. Application Data

[63] Continuation of Ser. No. 297,608, Jan. 13, 1989, abandoned.

[30] Foreign Application Priority Data

Jan. 15, 1988 [JP] Japan .................................. 63-7292

[51] Int. Cl.$^5$ ...................... C08L 29/04; C08L 23/08; B32B 27/28
[52] U.S. Cl. .................................. 428/522; 428/36.7; 428/516; 428/523; 524/140; 524/230; 524/249; 524/296; 524/297; 524/377; 524/388; 524/503; 525/57
[58] Field of Search ...................... 428/36.7, 523, 576, 428/522; 525/57; 524/140, 230, 249, 296, 297, 377, 388, 503

[56] References Cited

U.S. PATENT DOCUMENTS

| | | | |
|---|---|---|---|
| 4,281,045 | 7/1981 | Sumi | 428/516 |
| 4,645,695 | 2/1987 | Negi et al. | 525/57 |

FOREIGN PATENT DOCUMENTS

| | | |
|---|---|---|
| 51-48512 | 12/1976 | Japan . |
| 52-73984 | 6/1977 | Japan . |
| 52-77160 | 6/1977 | Japan . |
| 52-101182 | 8/1977 | Japan . |
| 54-53089 | 4/1979 | Japan . |
| 54-156082 | 12/1979 | Japan . |
| 032844 | 2/1985 | Japan .................................. 525/57 |
| 60-161447 | 8/1985 | Japan . |
| 163952 | 8/1985 | Japan .................................. 525/57 |
| 61-220839 | 10/1986 | Japan . |

OTHER PUBLICATIONS

Derwent Abstracts of J60161447, J54053089, J52101182.
WPI Patent Abstract JP-A-52-73984, 1977.
Japan, Abstract of Japan, vol. 22, No. 2609 (C-77), 1975.

*Primary Examiner*—John C. Bleutge
*Assistant Examiner*—David Buttner
*Attorney, Agent, or Firm*—Kramer, Brufsky & Cifelli

[57] ABSTRACT

The present invention provides resin compositions comprising a blend of two different saponified products of ethylene-vinyl acetate copolymers. The composition is much improved compared to a single EVOH in flexibility without adversely affecting the transparency and gas barrier property. Laminate films comprising at least one layer of said composition are excellent in resistance to dropping shock, ability to prevent air-back, skin-pack adaptability and shrink-packaging capability.

9 Claims, No Drawings

RESIN COMPOSITIONS AND MULTI-LAYERED STRUCTURES UTILIZING THE SAME

This application is a continuation of application Ser. No. 297,608, filed Jan. 13, 1989 now abandoned.

BACKGROUND OF THE INVENTION

1. Field of the invention

This invention relates to resin compositions being excellent in transparency and gas barrier property, as well as in flexibility as represented by resistance to dropping shock, flexural resistance, ability to prevent air-back, skin-pack adaptability, shrink-packaging capability, and the like; and further to multilayer structures comprising at least one layer of the composition.

2. Description of the Prior art

Saponified products of ethylene-vinyl acetate copolymers (hereinafter referred to as EVOH) are thermoplastic resins excellent in transparency, gas barrier property, resistance to oil and odor-keeping property as compared to other resins, and are thereby used for various gas-barrier films and for gas-barrier layers of various gas-barrier containers. However, multilayered films and multilayered containers comprising an EVOH as barrier layer often generate problems resulting from the high rigidity of EVOH. For example, a multilayered film or container filled with contents readily breaks when dropped onto the floor, a multilayered film filled with contents tends to generate thereon pinholes by action of bending and/or shock when transported, a multilayered tube often generates air-back, wrinkle generation upon skin-pack packaging, insufficient stretchability and/or shrinkage of films for shrink-packaging and so forth.

Blending other thermoplastic resins with EVOH has been tried to overcome the above-mentioned drawbacks. Thus, for example, Japanese Patent Application Laid-Open No. 220839/1986 discloses that blending EVOH with an ethylene-carboxylic acid vinyl ester copolymer or ethylene-acrylic acid ester copolymer improves the flexural resistance; and Japanese Patent Application Laid-Open No. 81448/1986 (U.S. Pat. No. 4,645,695) discloses that blending EVOH with an ethylene-carboxylic acid vinyl ester copolymer or ethylene-acrylic acid ester copolymer modified with an $\alpha,\beta$-unsaturated carboxylic acid or its anhydride improves the shock resistance of EVOH. While these methods improve flexural resistance and impact strength of EVOH, they impair the transparency characteristic to EVOH, thereby being inapplicable to such uses as require transparency.

Compositions comprising EVOH and polyamide are known to have high transparency. However, since blending of a polyamide results in a decrease in gas barrier property and worsens thermal stability at molding, thereby causing generation of gels in a short period of molding, such blended compositions have not been put to practical use.

Japanese Patent Publication No. 48512/1976 and japanese Patent Application Laid-Open Nos. 73984/1977, 77160/1977, 101182/1977, 53089/1979, 156082/1979 and 161447/1985 disclose about blending with EVOH a partially saponified product of ethylene-vinyl acetate copolymer (hereinafter referred to as "partially saponified EVA"), and that the use of such blend will give interfacial adhesiveness between EVOH and polyolefin or heat sealability at low temperatures. Actual preparation of molded articles such as film according to the process described in the above-mentioned prior arts has, however, encountered such problems as insufficient flexibility and poor thermal stability of obtained molded articles, poor surface appearance of obtained films such as streaks and pear skinned pattern and poor moldability due to frequent neck-in; and the process has thereby not been put into practical use yet. Nothing is thus known about the fact that a transparent gas-barrier resin composition can be obtained by blending EVOH with a partially saponified EVA both having specific melt indexes and vinyl alcohol component contents at a specific blending ratio, according to the present invention.

There have yet been thus obtained no transparent resin compositions or multilayered structures thereof having improved the flexibility of EVOH as represented by resistance to dropping shock, flexural resistance, prevention of air-back, skin-pack adapatability, shrink-packaging capability.

SUMMARY OF THE INVENTION

As stated above, there has been desired development of resin compositions or multilayered structures comprising them having sufficient flexibility for achieving sufficient resistance to dropping shock, flexural resistance, prevention of air-back, skin-pack adaptability, shrink-packaging capability and the like, without adversely affecting the transparency and the gas barrier property of EVOH.

The present inventors have made an intensive study to develop an excellent resin composition having high transparency, flexibility and gas barrier property. At first a film formed from a blend of an EVOH with a partially saponified EVA had many streaks and a pear skinned surface and was poor in transparency. Further the film formation itself was poorly achieved because of frequent neck-in. However, upon further investigation of a wide variety of both EVOH's and partially saponified EVA's for blends thereof, it was found that a film having excellent transparency and surface appearance can first be obtained with good formability when an EVOH having a specific melt index at 190.C-2160 g (hereinafter referred to as MI) and a specific vinyl alcohol component content is blended with a partially saponified EVA having a specific MI and a specific vinyl alcohol component content at a specific blending ratio and the invention was completed.

DETAILED DESCRIPTION OF THE PREFERRED EMBODIMENTS

Hereinbelow the present invention will further be illustrated in detail. EVOH (A) used in the invention has an ethylene content of 25 to 50 mol % and a saponification degree of vinyl acetate component of at least 90%, preferably at least 95%. If the ethylene content is less than 25 mol %, the molding temperature will be close to the decomposition temperature, thereby rendering the molding difficult to perform; and if the ethylene content exceeds 50 mol %, the gas barrier property will be insufficient. An EVOH having a saponification degree of vinyl acetate component of less than 90% also has an insufficient gas barrier property. The MI of EVOH used in the invention is not more than 15 g/10 min, preferably not more than 7 g/10 min. If the MI exceeds 15 g/10 min, the blend of such EVOH with a partially saponified EVA will suffer a large neck-in at molding, resulting in unsuccessful molding. The MI is of EVOH is preferably at least 0.1 g/10 min, more preferably at least 0.5 g/10 min.

The EVOH in the present invention may be one modified with not more than 5 mol % of a copolymerizable monomer. Examples of such modifying monomer include, among others, propylene, 1-butene, 1-hexene, 4-methyl-1-pentene, acrylic acid esters, methacrylic acid esters, maleic acid, fumaric acid, itaconic acid, higher fatty acid vinyl esters, alkylvinyl esters, N-(dimethylamonoethyl)-methacrylamide or its quaternary compound, N-vinylpyrrolidone, N,N-butoxymethylacrylamide, vinyltrimethoxysilane, vinylmethyldimethoxysilane and vinyldimethylmethoxysilane.

The partially saponified EVA (B) used in the invention must have an ethylene content of 80 to 94 mol %, preferably 84 to 92 mol % and a saponification degree of vinyl acetate component of at least 20%, preferably at least 30%, most preferably at least 40%. The saponification degree of the partially saponified EVA is preferably not more than 98%, more preferably not more than 97%. When the ethylene content is less than 80 mol %, its thermal stability becomes poor upon blending with EVOH. On the other hand when the ethylene content exceeds 94 mol %, the blending does not produce improvement effects on resistance to dropping shock, flexural resistance, prevention of air-back, skin-pack adaptability, shrink-packaging capability, and the like. A saponification degree of less than 20% will worsen the transparency. The saponified EVA must have an MI which satisfies the formula (1), and preferred from the standpoint of ease of molding are those EVA's having an MI of not more than 100 g/10 min, more preferably not more than 30 g/10 min, most preferably not more than 20 g/10 min. The MI of the partially saponified EVA is preferably at least 0.1 g/10 min, more preferably at least 0.5 g/10 min.

The blending ratio of the EVOH (A) with the partially saponified EVA (B) is 60 to 95 wt % of the former with 5 to 40 wt % of the latter, and preferably 70 to 90 wt % of the former with 10 to 30 wt % of the latter.

The present invention employs a specific EVOH and a specific partially saponified EVA, whose MI's, contents of vinyl alcohol component and blending ratio yield a P-value by the following formula (1) of not more than 40, preferably not more than 15. The P-value is preferably at least 0.6, more preferably at least 0.8.

$$P = M \times \left( \frac{VA_A}{2} - VA_B \right) \times (B + 20)/100 \quad (1)$$

where:
$M = M_A/M_B$ (when $M_A \geq M_B$)
$M = M_B/M_A$ (when $M_Z < M_B$)
$M_A$: MI of resin A
$M_B$: MI of resin B
$VA_A$: content of vinyl alcohol component in resin A (mol %)
$VA_B$: content of vinyl alcohol component in resin B (mol %)
B: wt % of resin B blended in the composition The P-value obtained by formula (1) is very important with regard to the transparency of the composition; and the smaller the value, the better the transparency. When the P-value exceeds 40, the transparency is almost lost. This can be seen on a single-layer film prepared from the composition, where the film from a composition having a P-value exceeding 40 has many streaks or pear skinned pattern and its transparency is extremely decreased. The generation of streaks or pear skinned pattern is found to be influenced also by the relative amounts of $M_A$ and $M_B$. When $M_A > M_B$, pear skinned pattern will readily generate and when $M_A < M_B$ streaks tend to be formed. Further, the transparency of the composition depends on the contents of vinyl alcohol component in EVOH and in partially saponified EVA in such a manner that the smaller the difference between the vinyl alcohol component of EVOH and that of partially saponified EVA, the better the transparency. The transparency further depends on the blending ratio of EVOH and partially saponified EVA, the transparency of the obtained film being better as the blending ratio of partially saponified EVA becomes small. It had never been known and therefore was quite unexpectedly found that, as described hereinabove, the ratio of MI's of EVOH and partially saponified EVOH has such big influence on the appearance of the film surface, and further the P-value obtained by formula (1) from MI ratio, difference in vinyl alcohol contents and the blending ratio has such a big influence on the transparency.

In the present invention, practice of blending the EVOH with the partially saponified EVA is conducted using a Banbary mixer, single- or twin-screw extruder, Brabender Plastograph, and the like, and may also be done by directly charging the components to a molding machine of various types where they are kneaded with each other. Addition of a plasticizer upon kneading the composition is preferred because a larger softening effect is thereby obtained by synergetic effect of the plasticizer and partially saponified EVA. Examples of preferred plasticizers are alcohol-related plasticizers such as glycerine, diglycerine, 1,2-propanediol, 1,3-propanediol, 1,2-butanediol, 1,3-butanediol, 2,3-butanediol, 1,4-butanediol, 1,2,6-hexanetriol, diethanolamine and diethylene glycol; while also used are dimethyl phthalate, diethyl phthalate, dioctyl phthalate, wax, liquid paraffine, phosphoric acid esters, and amides such as lauryl amide and o,p-toluenesulfonamide, N-ethyl-o,p-toluenesulfonamide.

Other additives such as various resins, heat stabilizers, antioxidants and colorants may optionally be added within limits not to impair the effect and function of the present invention. Particularly effective heat stabilizers are those used for polyvinyl chloride such as hydrotalcite compounds, metal soap, lead-salt compounds and organotitanates; hindered-phenol compounds, hindered-amine compound, sulfides and phosphite, among which hydrotalcites are most preferred.

The resin composition of the present invention is preferably used in a form of laminate, in which it can constitute any of intermediate layers, outermost layer and innermost layer. There are no particular limits in resins to be laminated with the resin composition of the present invention but, generally, preferred are ones having a high transparency, e.g. polyolefins such as low-density polyethylene, linear low-density polyethylene, polypropylene, ethylene-propylene copolymers and polybutene; olefin copolymers such as ethylene-vinyl acetate copolymers, ethylene-ethyl acrylate copolymers and ionomers, each of which has principally olefin; polyethylene terephthalate; polycarbonates; polyamides; polystyrene; polyvinyl chloride; water-crosslinked polyolefins (siloxane-crosslinked polyolefins); radiation-cured polyolefins and the like. Among these, more preferred are linear low-density polyethylene, ethylene-vinyl acetate copolymers, and polyamides.

In the case where the interfacial adhesion between such resin and EVOH is insufficient, an adhesive resin layer is preferably provided therebetween. Any adhesive resin may be used as long as it will not cause any delamination when the laminate is in practical use but, preferably used are modified olefin copolymers comprising a polyolefin-related polymer such as polyethylene, an ethylene-vinyl acetate copolymer having a vinyl acetate content of not more than 45 wt % or an ethylene-(meth)acrylic acid ester having a (meth)acrylic acid ester content of not more than 45 wt %, modified by chemically bonding (e.g. by addition or by grafting) thereto an ethylenically unsaturated carboxylic acid or its anhydride. These adhesive resins can not only be provided between the layers but also be incorporated into either one or both of the layers.

The laminates comprising the resin composition of the present invention can be molded into films, sheets, tubes pipes, bottles and the like. There is no particular limitation on the thickness construction of the laminate but, it is preferred for better transparency that the layer of the resin composition of the invention be used in a thickness of not more than 300 μ, more preferably not more than 200 μ.

As methods for laminating the resin composition of the invention, mentions are made of coextrusion process, extrusion lamination process, dry lamination process and the like, among which particularly preferred is coextrusion process because the characteristics of the resin composition of the invention thereby exerts most.

The laminates thus obtained can be used as containers having excellent resistance to dropping shock, tubes being excellent in preventive ability of air-back, bag-in-boxes excellent in flexural resistance, and films excellent in skin-pack adapatability and shrink-packaging capability. Further, laminates (pipes) comprising the resin composition layer and a layer of a resin selected from water-crosslinked polyolefins, radiation-cured polyolefins and polybutene can be used for floor-heating piping. In this case the resin composition is preferably used as an intermediate or the outermost layer.

Other features of the invention will become apparent in the course of the following descriptions of exemplary embodiments which are given for illustration of the invention and are not intended to be limiting thereof.

EXAMPLE 1

70 parts by weight of an EVOH having an ethylene content of 44 mol %, a saponification degree of vinyl acetate component of 99% and a melt index (MI) measured at 190° C. under 2160 g according to ASTM D1238-65T of 5.5 g/10 min and 30 parts by weight of a partially saponified EVA having an ethylene content of 88 mol %, a saponification degree of vinyl acetate component of 80% and an MI of 4.8 g/10 min were blended and extruded through a 30-φ different direction twin-screw extruder into pellets ? -value=10.4). The thus obtained pellets were formed through a 40-φ single-screw extruder into a film having a thickness of 25 μ. The obtained film was evaluated for surface appearance, formability, haze, loop stiffness, flexural resistance, Young's modulus and oxygen gas transmission rate (OTR).

The evaluation of the film appearance was done on streaks, pear skinned pattern and gels by visual inspection with the results expressed in terms of ranking A through E shown in Table 1. The evaluation for the formability was done in terms of the degree of neck-in occurred as expressed by ranking A through E shown.

TABLE 1

| Rank | Streaks | Pear skinned pattern | Gel | Neck-in |
|---|---|---|---|---|
| A | None | None | None | None |
| B | Minute streaks | Minute pear-skin | | |
| C | Streaks | Pear-skin pattern | A small amt of gels | A little neck-in |
| D | Big & many streaks | Big pear-skin pattern | | |
| E | - Film formation unsuccesful - | | Very many gels | Frequent neck-in |

Haze was measured with Poic Integrated Sphere light transmission tester made by Nihon precision Optics Co.

Loop stiffness was measured at 20° C. and 65% RH with a loop stiffness tester made by Toyo Seiki Co. on a film specimen of 15 mm wide folded into a loop of 60 mm long for its repulsive force when compressed to a loop diameter of 20 mm. The loop stiffness is important as a measure for the ability of preventing air-back. Compositions having smaller loop stiffness are thought to be of higher ability to prevent air-back.

Flexural resistance was evaluated using Gelbo Flex Tester made by Rigaku Kogyo Co. as follows. A specimen of 12 in.×8 in. was made round such that the both ends meet to form a cylinder having a diameter of 3.5 inches. The both ends of the thus formed cylinder was held at an initial holding distance of 7 inches and a holding distance when flexed to the maximum of 1 inch. The thus held specimen was subjected to 300 reciprocating motions, one motion consisting of twisting it to an angle of 440. in the first 3.5 inches of the stroke and the succeeding linear horizontal move of 2.5 inches, at a rate of 40 times/min under conditions of 20° C. and 65% RH. Then the number of pinholes formed on the specimen was determined.

Young's modulus was measured at 20° C., 65% RH according to ASTM D-882-67. It is important as to skin-pack adaptability and shrink-packaging capability. A composition having a low Young's modulus may be suited for skin-pack and shrink-film packaging where a stretching process is involved.

Oxygen gas transmission rate (OTR) or, oxygen permeability, was determined using OX-TRAN 10-50A made by Modern Control Co.

The results of the evaluations are shown in Table 2. The film obtained in this Example was excellent in film appearance, formability and transparency, as well as flexibility as represented by loop stiffness, flexural resistance and Young's modulus, and in gas barrier property.

EXAMPLES 2 THROUGH 11

Compositions comprising EVOH's and partially saponified EVA's shown in Table 2 were evaluated in the same manner as in Example 1, to give results shown in Table 2. These compositions were also excellent in surface appearance, formability and transparency, as well as flexibility as represented by loop stiffness, flexural resistance and Young's modulus, and in gas barrier property.

COMPARATIVE EXAMPLE 1

An EVOH having an ethylene content of 44 mol %, a saponification degree of vinyl acetate component of 99% and an MI of 5.5 g/10 min was molded through a 40-φ single-screw extruder and formed into a film having a thickness of 25 μ. The obtained film was evaluated in the same manner as in Example 1 to give results shown in Table 2. The film had large values of loop stiffness, flexural resistance (number of pinholes generated) and Young's modulus, proving its poor flexibility.

COMPARATIVE EXAMPLES 2 THROUGH 11

Compositions comprising EVOH's and partially saponified EVA's shown in Table 2 were evaluated in the same manner as in Example 1, to give results shown in Table 2.

The film of the composition of Comparative Example 2 had large values of loop stiffness and Young's modulus, and had a large number of pinholes, all of which show that it was short of flexibility.

The film of the composition of Comparative Example 3 had a large OTR value, showing its insufficient gas barrier property.

In Comparative Example 4, neck-in occurred frequently and the formability was poor.

In Comparative Examples 5 and 6, large OTR values show that the compositions were poor in gas barrier property.

In Comparative Example 7, very many gels generated on the film, which was not usable. Large number of pinholes generated in the test due to the production trouble above or from some other causes.

The film of the composition of Comparative Example 8 had large values of loop stiffness and Young's modulus, and had a large number of pinholes, all of which shows that it was short of flexibility.

In Comparative Example 9, haze value was large due to the low saponification degree of the partially saponified EVA, and the film was thereby poor in transparency.

In Comparative Examples 10 and 11, serious streaks and pear skinned pattern generated due to the high P-value of more than 40, thereby causing large haze and rendering the film poor in transparency.

EXAMPLE 12

70 parts by weight of an EVOH having an ethylene content of 44 mol % a saponification degree of vinyl acetate component of 99% and an MI of 5.5 g/10 min, 30 parts by weight of a partially saponified EVA having an ethylene content of 88 mol %, a saponification degree of vinyl acetate component of 80% and an MI of 4.8 g/10 min and 3 parts by weight of glycerine were made into pellets and the pellets formed into a film having a thickness of 25 μ in the same manner as Example 1. The film-formability was good. The thus obtained film had a haze of 2%, a loop stiffness of 100 mg and a Young's modulus of 40 kg/mm². The film yielded no pinholes by 300-times Gelbo Flex test, showing its high flexibility. The OTR was 2.2 cc/m².day.atm proving the high gas barrier property of the film.

TABLE 2

| | EVOH (Resin A) | | | | | Partially saponified EVA (Resin B) | | | | | |
|---|---|---|---|---|---|---|---|---|---|---|---|
| | Et* content mol % | Saponification degree % | $VA_A$ content mol % | MI g/10 min | Blending ratio wt % | Et* content mol % | Saponification degree % | $VA_B$ content mol % | MI g/10 min | Blending ratio wt % | P-Value |
| Ex. 1 | 44 | 99 | 55.4 | 5.5 | 70 | 88 | 80 | 9.6 | 4.8 | 30 | 10.4 |
| Ex. 2 | 44 | 99 | 55.4 | 5.5 | 93 | 88 | 80 | 9.6 | 4.8 | 7 | 5.6 |
| Ex. 3 | 44 | 99 | 55.4 | 5.5 | 60 | 82 | 95 | 17.1 | 5.2 | 40 | 6.7 |
| Ex. 4 | 29 | 99 | 70.3 | 1.2 | 70 | 88 | 80 | 9.6 | 1.0 | 30 | 15.3 |
| Ex. 5 | 32 | 92 | 62.6 | 1.7 | 80 | 88 | 80 | 9.6 | 1.0 | 20 | 18.4 |
| Ex. 6 | 44 | 99 | 55.4 | 5.5 | 70 | 92 | 80 | 6.4 | 5.3 | 30 | 14.8 |
| Ex. 7 | 48 | 99 | 51.5 | 10 | 80 | 88 | 80 | 9.6 | 14 | 20 | 9.0 |
| Ex. 8 | 48 | 99 | 51.5 | 13 | 80 | 88 | 71 | 8.5 | 16 | 20 | 10.0 |
| Ex. 9 | 44 | 99 | 55.4 | 5.5 | 70 | 88 | 30 | 3.6 | 6.0 | 30 | 13.1 |
| Ex. 10 | 44 | 99 | 55.4 | 5.5 | 70 | 88 | 80 | 9.6 | 20 | 30 | 32.9 |
| Ex. 11 | 44 | 99 | 55.4 | 5.5 | 70 | 88 | 80 | 9.6 | 1.5 | 30 | 33.2 |
| Comp. Ex. 1 | 44 | 99 | 55.4 | 5.5 | 100 | — | — | — | — | — | — |
| Comp. Ex. 2 | 44 | 99 | 55.4 | 5.5 | 97 | 88 | 80 | 9.6 | 4.8 | 3 | 4.8 |
| Comp. Ex. 3 | 44 | 99 | 55.4 | 5.5 | 50 | 82 | 95 | 17.1 | 5.2 | 50 | 7.8 |
| Comp. Ex. 4 | 38 | 99 | 61.4 | 18 | 70 | 88 | 75 | 9.0 | 25 | 30 | 15.1 |
| Comp. Ex. 5 | 55 | 99 | 44.6 | 20 | 70 | 82 | 95 | 17.1 | 5.2 | 30 | 10.0 |
| Comp. Ex. 6 | 32 | 85 | 57.8 | 1.5 | 85 | 88 | 80 | 9.6 | 1.0 | 15 | 10.1 |
| Comp. Ex. 7 | 38 | 99 | 61.4 | 12 | 70 | 78 | 70 | 15.4 | 15 | 30 | 9.6 |
| Comp. Ex. 8 | 44 | 99 | 55.4 | 5.5 | 70 | 97 | 80 | 2.4 | 6.1 | 30 | 14.0 |
| Comp. Ex. 9 | 44 | 99 | 55.4 | 5.5 | 70 | 88 | 10 | 1.2 | 4.5 | 30 | 16.2 |
| Comp. Ex. 10 | 44 | 99 | 55.4 | 5.5 | 70 | 88 | 80 | 9.6 | 25 | 30 | 41.1 |
| Comp. Ex. 11 | 44 | 99 | 55.4 | 5.5 | 70 | 88 | 80 | 9.6 | 1.0 | 30 | 49.8 |

| | | | | Film properties | | | |
|---|---|---|---|---|---|---|---|
| | Film surface pear- | Formability | Haze | Loop stiffness | Flexural resistance No. of | Young's modulus | OTR cc/m²·day· |

TABLE 2-continued

|  | streaks | skin | gels | bility | % | mg | pinholes | kg/mm² | atm |
|---|---|---|---|---|---|---|---|---|---|
| Ex. 1 | A | A | A | A | 2 | 150 | 0 | 80 | 1.7 |
| Ex. 2 | A | A | A | A | 1 | 200 | 0 | 120 | 0.8 |
| Ex. 3 | A | A | A | A | 3 | 60 | 0 | 60 | 2.7 |
| Ex. 4 | A | B | A | A | 4 | 200 | 0 | 110 | 0.5 |
| Ex. 5 | A | B | A | A | 2 | 200 | 0 | 120 | 2.8 |
| Ex. 6 | A | A | A | A | 3 | 160 | 0 | 100 | 1.6 |
| Ex. 7 | A | A | A | A~B | 2 | 160 | 0 | 90 | 1.8 |
| Ex. 8 | A | A | A | B | 2 | 160 | 0 | 90 | 1.8 |
| Ex. 9 | A | A | A | A | 4 | 140 | 0 | 80 | 1.6 |
| Ex. 10 | B | A | A | A | 2 | 150 | 0 | 90 | 1.5 |
| Ex. 11 | A | B | A | A | 2 | 140 | 0 | 90 | 1.4 |
| Comp. Ex. 1 | A | A | A | A | 1 | 410 | >100 | 200 | 1.7 |
| Comp. Ex. 2 | A | A | A | A | 2 | 350 | >100 | 190 | 1.0 |
| Comp. Ex. 3 | B | C | B | B | 10 | 70 | 0 | 80 | 12.6 |
| Comp. Ex. 4 | A | A | B | E | 2 | 170 | 3 | 100 | 1.4 |
| Comp. Ex. 5 | A | A | A | C | 2 | 120 | 0 | 80 | 10.1 |
| Comp. Ex. 6 | A | A | B | A | 2 | 150 | 0 | 90 | 10.8 |
| Comp. Ex. 7 | A | A | E | C | 4 | 170 | 10 | 100 | 1.2 |
| Comp. Ex. 8 | A | B | A | A | 8 | 260 | 53 | 150 | 1.5 |
| Comp. Ex. 9 | A | C | A | A | 25 | 160 | 0 | 100 | 1.8 |
| Comp. Ex. 10 | E | C | A | B | 56 | 150 | 0 | 90 | 1.9 |
| Comp. Ex. 11 | A | E | A | A | 42 | 160 | 0 | 90 | 2.0 |

*"ET" stands for "Ethylene".

EXAMPLE 13

A 3-kind/5-layer laminated film having a total thickness of 85 μ was prepared by coextrusion with 3 extruders and a 3-kind/5-layer diehead, with the following construction. The composition used for the intermediate layer having a thickness of 15 μ was: 70 parts by weight of an EVOH having an ethylene content of 44 mol % a saponification degree of vinyl acetate component of 99% and an MI of 5.5 g/10 min and 30 parts by weight of a partially saponified EVA having an ethylene content of 89 mol %, a saponification degree of vinyl acetate component of 95% and an MI of 4.8 g/10 min; and the intermediate layer had a P-value of 10.4. The composition was blended through an extruder into pellets prior to film formation. The outer and inner layers each had a thickness of 30 μ and comprised a linear low-density polyethylene copolymer containing 3.2 mol % of 4-methyl-1-pentene and having an MI of 2.1 g/10 min. Between the layers an adhesive resin layer of 5 μ thick each was provided, which comprises an ethylene-vinyl acetate copolymer modified with maleic anhydride containing vinyl acetate component in an amount of 20 wt % and maleic anhydride component in an amount of 0.5 wt %.

The obtained laminate film was subjected to Gelbo Flex test, which proceeded until generation of pinholes on the film, whereby the oxygen gas transmission rate was determined at 20° C., 65% RH at several steps before the start of pinhole generation. At that time the specimen at each step of the flex test was flattened to the original rectangle of 12 in.×8 in. and the center part of the rectangle was tested for OTR. The results are shown in Table 3. No appreciable change in the oxygen transmission rate was observed in the course of the flex testing up to the point of pinhole generation. Generation of pinholes had not been observed before 7,000 strokes were complete. One pinhole was first observed when the film was checked for pinholes after 7,100 strokes of the test. No delaminations between layers were observed during the test. The film had a haze of 4%, was good in transparency, and had no appreciable streaks or pear skinned pattern.

COMPARATIVE EXAMPLE 12

Example 13 was repeated except for using as the resin to be blended with EVOH for the intermediate layer an ethylene-vinyl acetate copolymer having an ethylene content of 89 mol % and an MI of 6 g/10 min to give test results also shown in Table 3. Though the flexural fatigue test showed a good result similar to that in Example 13, the film had a haze of 25%, being short of transparency.

TABLE 3

|  | No. of strokes in flexural fatigue test | No. of pinholes | Oxygen transmission rate cc/m² · day · atm | Haze |
|---|---|---|---|---|
| Example 13 | 0 | 0 | 1.1 | 4 |
|  | 1000 | 0 | 1.2 |  |
|  | 2000 | 0 | 1.2 |  |
|  | 3000 | 0 | 1.2 |  |
|  | 7000 | 0 | 1.2 |  |
| Comp. Ex. 12 | 0 | 0 | 1.2 | 25 |
|  | 1000 | 0 | 1.2 |  |
|  | 2000 | 0 | 1.2 |  |
|  | 3000 | 0 | 1.2 |  |
|  | 7000 | 0 | 1.2 |  |

EXAMPLE 14

A multilayered container having a capacity of 10 liters and a construction described below was prepared by coextrusion direct-blow molding using 2 extruders and a 2-kind/3layer diehead. The intermediate layer had an average thickness of 15 μ and a P-value of 10.4 and comprised a composition made of 70 parts by weight of an EVOH having an ethylene content of 44 mol %, a saponification degree of vinyl acetate component of 99% and an MI of 5.5 g/10 min and 30 parts by weight of a partially saponified EVA having an ethylene content of 89 mol %, a saponification degree of vinyl acetate component of 95% and an MI of 4.8 g/10 min. The composition was blended through an extruder into pellets prior to the molding. The outer and inner layers provided on both sides of the intermediate layer each had an average thickness of 300 μ and comprised a composition of 70 parts by weight of an ethylene-vinyl acetate copolymer having a vinyl acetate content of 5 wt % and 30 parts by weight of an ethylene-vinyl acetate copolymer modified with maleic anhydride containing vinyl acetate component in an amount of 20 wt % and maleic anhydride component in an amount of 0.5 wt %. The container was filled with 10 liters of water and the container with the contents was dropped 3 times from a height of 1 meter to show no breakage, proving its high resistance to dropping shock.

COMPARATIVE EXAMPLE 13

Example 14 was repeated except for using an intermediate layer of the EVOH alone. In the dropping test, the container broke at the first dropping.

EXAMPLE 15

A multilayered tube having a capacity of 250 ml, an average total wall thickness of 350 μ and a construction described below was prepared by direct-blow molding using 3 extruders and a 3-kind/5-layer diehead. The intermediate layer had an average thickness of 20 μ and a P-value of 10.4 and comprised a composition made of 70 parts by weight of an EVOH having an ethylene content of 44 mol % a saponification degree of vinyl acetate component of 99% and an MI of 5.5 g/10 min and 30 parts by weight of a partially saponified EVA having an ethylene content of 89 mol %, a saponification degree of vinyl acetate component of 95% and an MI of 4.8 g/10 min. The composition was blended through an extruder into pellets prior to the molding. The outer and inner layers provided on both sides of the intermediate layer each had an average thickness of 150 μ and comprised an ethylene-vinyl acetate copolymer having a vinyl acetate content of 8 wt %. Between the layers interposed were adhesive resin layers each having an average thickness of 15 μ and comprising an ethylene-vinyl acetate copolymer modified with maleic anhydride containing vinyl acetate component in an amount of 20 wt % and maleic anhydride component in an amount of 0.5 wt %. The obtained tube was cut at the center to a length of 15 mm. The cut piece showed, when compressed with a loop stiffness tester by 10 mm, a repulsive force of 650 mg.

COMPARATIVE EXAMPLE 14

Example 15 was repeated except for using for the intermediate layer an EVOH having an ethylene content of 44 mol % and a saponification degree of vinyl acetate component of 99% and an MI of 5.5 g/10 min singly. Loop stiffness testing was conducted in the same manner as in Example 14, to obtain a repulsive force of 1500 mg.

We claim:
1. A resin composition consisting essentially of 60 to 95 wt. % of a saponified product of an ethylene-vinyl acetate copolymer (A) having an ethylene content of 25 to 50 mol %, a saponification degree of vinyl acetate component of at least 90%, and a melt index at 190° C. -2160 g (MI) of not more than 15 g/10 min and 40 to 5 wt % of a partially saponified product of an ethylene-vinyl acetate copolymer (B) having an ethylene content of 82 to 94 mol %, a saponification degree of vinyl acetate component of 20 to 98%; the MI's and the vinyl alcohol contents of resin (A) and resin (B) and the blending ratio of resin (B) in said composition giving P-value obtained from the following formula (1) of not more than 40:

$$P = M \times \left( \frac{VA_A}{2} - VA_B \right) \times (B + 20)/100 \tag{1}$$

where:
$M = M_A/M_B$ (when $M_A \geq M_B$)
$M = M_B/M_A$ (when $M_A < M_B$)
$M_A$: MI of resin A
$M_B$: MI of resin B
$VA_A$: content of vinyl alcohol component of resin A (mol %)
$VA_B$: content of vinyl alcohol component of resin B (mol %)
B: wt % of resin B blended in the composition.

2. A resin composition as defined in claim 1, wherein said P-value obtained from formula (1) is not more than 15.

3. A resin composition as defined in claim 1 or claim 2, wherein said saponified product of ethylene-vinyl acetate copolymer (A) has an MI of not more than 7 g/10 min.

4. A resin composition as defined in claim 1, wherein said saponified product of an ethylene-vinyl acetate copolymer (B) has a saponification degree of vinyl acetate component of 30 to 98.

5. A multilayered structure comprising at least one layer made of the resin composition of claim 1.

6. A resin composition as defined in claim 1, wherein said saponified product of an ethylene-vinyl acetate copolymer (A) has an ethylene content of 84 to 94 mol %.

7. A resin composition according to claim 1, additionally including an additive selected from the group consisting of plasticizers, heat stabilizers, antioxidants and colorants.

8. A resin composition according to claim 7, wherein the additive is a plasticizer.

9. A resin composition according to claim 8, wherein the plasticizer is selected from the group consisting of glycerine, diglycerine, 1,2-propanediol, 1,3-propanediol, 1,2-butanediol, 1,3-butanediol, 1,2,6-hexanetriol, diethanolamine and diethylene glycol, dimethylphthalate, diethyl phthalate, dioctyl phthalate, wax, liquid paraffin, phosphoric acid esters and amides.

* * * * *